United States Patent [19]
Jennings, Jr.

[11] Patent Number: 5,307,875
[45] Date of Patent: May 3, 1994

[54] MATRIX ACIDIZING IN SANDSTONE FORMATIONS

[75] Inventor: Alfred R. Jennings, Jr., Plano, Tex.

[73] Assignee: Mobil Oil Corporation, Fairfax, Va.

[21] Appl. No.: 995,277

[22] Filed: Dec. 22, 1992

[51] Int. Cl.$^5$ .................. E21B 43/26; E21B 43/27
[52] U.S. Cl. .................. 166/282; 166/281; 166/300; 166/307
[58] Field of Search ........... 166/281, 282, 300, 307; 252/8.553

[56] References Cited

U.S. PATENT DOCUMENTS

| | | | |
|---|---|---|---|
| 4,007,789 | 2/1977 | Clampitt | 166/281 |
| 4,237,975 | 12/1980 | Scherubel | 166/281 |
| 4,322,306 | 3/1982 | Dill | 166/307 X |
| 4,787,456 | 11/1988 | Jennings, Jr. et al. | 166/281 |
| 4,807,703 | 2/1989 | Jennings, Jr. | 166/307 |
| 4,883,124 | 11/1989 | Jennings, Jr. | 166/307 |

Primary Examiner—George A. Suchfield
Attorney, Agent, or Firm—Alexander J. McKillop; George W. Hager, Jr.; Charles A. Malone

[57] ABSTRACT

A method for improved matrix acidizing of a sandstone formation containing a perforated well. Initially, a "prepad" and a temperature stable viscous gel pad are pumped into the formation via said well at injection pressures greater than 5 BPM while monitoring surface pressures. Next, an acid suitable for acidizing the formation is pumped into the formation while the injection pressure is maintained. Thereafter, additional stages of viscous pad and acid are pumped into the formation to ensure zonal coverage and acid-stimulation.

21 Claims, 2 Drawing Sheets

MATRIX ACIDIZING IN SANDSTONE FORMATIONS

FIELD OF THE INVENTION

This invention is directed to methods for acidizing oil producing intervals of subterranean formations, and more particularly sandstone formations where a gel and an acid are utilized.

BACKGROUND OF THE INVENTION

For many years acid has been used to effectively remove wellbore damage in wells completed in sandstone formations. In a sandstone formation, which for purposes of this disclosure is one which is principally comprised of silica and clay. It may also contain calcareous constituents, the clay components thereof which can interfere with movement of fluid through the formation to, for example, a wellbore. This interference can be due to clay particles which cause the moving fluid to migrate into and plug passages of the formation and severely reduce the formation's permeability. This occurrence is referred to herein as clay damage. Clay damage can also be caused by clay which swells upon contact with foreign liquids.

In high deliverability wells, common practice is to pump acid at rates and pressures lower than fracturing pressures so as to place acid into the matrix of the formation without creating a hydraulic fracture. In order to cover zones of interest as completely as possible, it is also a common practice to use solid materials (such as benzoic acid flakes, rock salt, paraffin flakes, etc.) in conjunction with stages of acid in an effort to treat the entire zone of interest. Effective staging of acid is critical to remove clay damage over extensive intervals with varying permeabilities. Unfortunately, solid materials which are used to divert acid into all intervals can themselves damage the formation when it becomes impossible to remove them.

Low acid pressure injection rates can cause an additional problem. Low injection rates are defined herein to mean an injection rate less than 5 barrels per minute (BPM). When acid is injected at low rates only one perforation in a "cluster" of perforations or zone may take acid. With continued reaction at low injection rates, there is an even greater likelihood that only one perforation or zone will receive acid.

Therefore, what is needed is a method for diverting acid at high injection rates into all intervals of a formation via a diverting agent which diverting agent does not itself cause additional damage to the formation.

SUMMARY OF THE INVENTION

This invention is directed to a method for improving the effectiveness of "matrix" sandstone acidizing in high deliverability perforated wells. Initially, a "pre-pad" and pad of a temperature stable viscous gel are pumped at injection rates into the well while monitoring surface pressures. The pre-pad and pad serve to cool the formation, equalize injection into high and moderate permeability intervals due to the viscosity of the pad. Although not required in the practice of this invention, a fracture may be created in a sandstone interval or pay zone.

After the high viscosity pad has closed off all of the desired high and moderate permeability zones, a slug or stage of acid is pumped into the well while the injection pressure is maintained. This acid which is injected into the wellbore enters via perforations, other intervals of the formation which intervals had previously been prevented from receiving either the pre-pad or pad due to the presence of a mechanical packer. The mechanical packer can be re-positioned and another pad injected into the wellbore to close off the acidized interval. Subsequently, the packer is re-positioned and another interval is acidized. The procedure of pad injection, re-positioning of the packer and acidizing are repeated until all desired intervals have been acidized. When the desired intervals have been treated with acid, the pad deteriorates and all intervals are placed back on production.

It is therefore an object of this invention to obtain a more efficient radial coverage of acid into all desired intervals of a sandstone formation.

It is another object of this invention to increase acid reactivity by alternating stages of a viscous, non-reactive pad and an acid by optimizing acid placement.

It is a further object of this invention to take advantage of any hydraulic fracturing by acidizing to enhance zonal coverage and remove clay damage from the formation.

It is a still further object of this invention to close off a high permeability zone of a formation prior to acidizing another lower permeability zone to remove clay damage therefrom.

DESCRIPTION OF THE PREFERRED EMBODIMENTS

Figure 1:
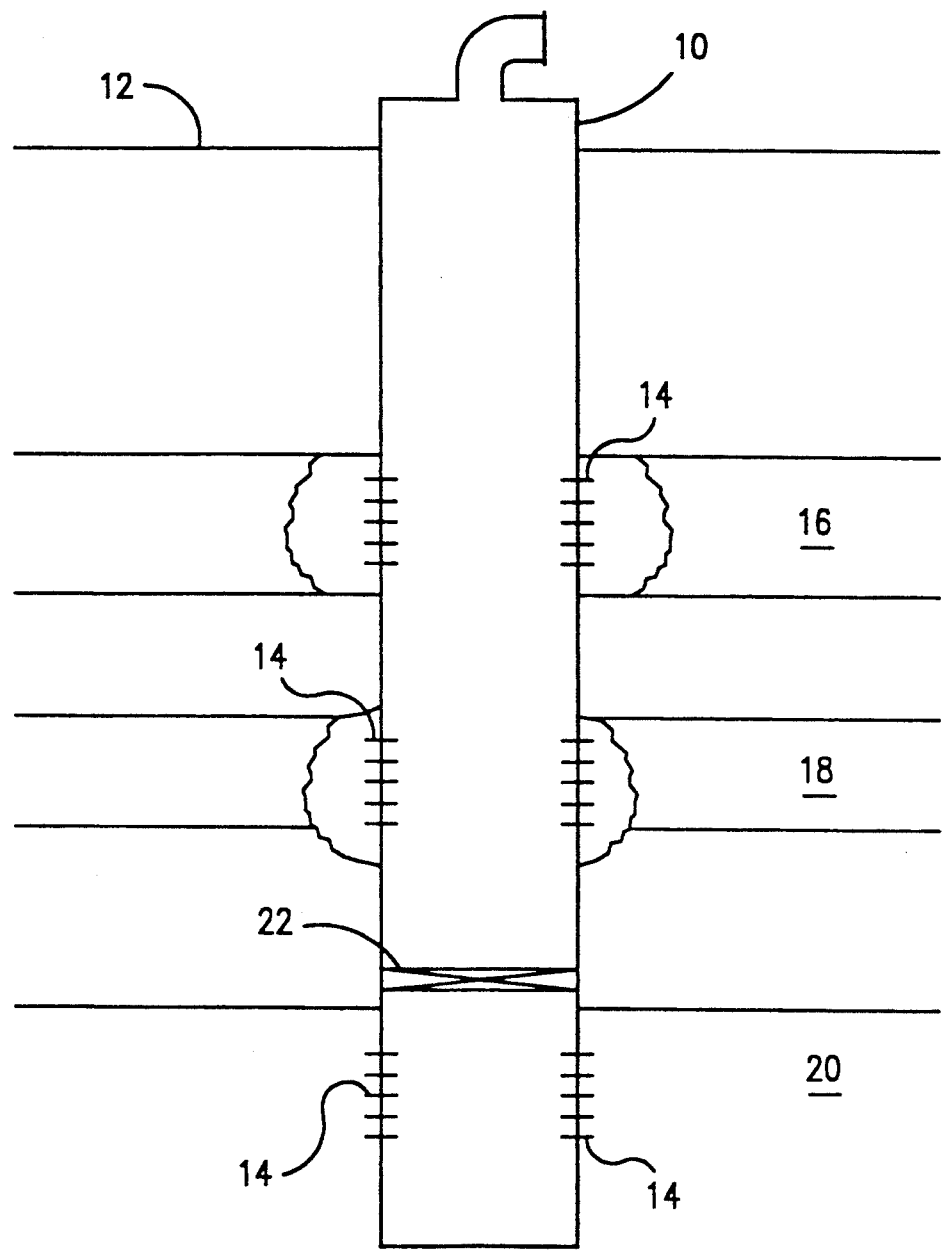
FIG. 1 is a schematic representation which depicts high and moderate permeability intervals or zones closed to fluid flow while another interval or zone with a packer therebetween is prevented from receiving fluid.

In the practice of this invention, referring to FIG. 1, a "pre-pad" pore volume of a salt conditioning solution is directed into wellbore 10 located in formation 12 via perforations 14. Prior to directing the pre-pad into desired intervals of formation 12 communicating with perforated wellbore 10, a mechanical packer 22, is placed in the wellbore so as to isolate lower permeability zone or interval 20 from those above. Once the pre-pad has conditioned and cooled moderate permeability interval 18 and high permeability interval 16, a pad of a viscous gel is injected into moderate and high permeability zones so as to effectively make them resistive to fluid flow from the wellbore. If desired the viscous gel may contain a gel breaker if it is desired to open moderate and high permeability intervals to fluid flow after acidizing the lower permeability zone or interval. The size of the viscous gel utilized may be determined from surveys of intervals or by use of a spinner survey for example to determine their permeabilities. Also, core samples obtained during the drilling of the wellbore may be utilized.

The viscous gel that is injected into the intervals is injected at rates greater than 5 BPM while monitoring surface pressures. As used herein, the purpose of the viscous gel pad is to equalize a subsequent injection of acid into these intervals. The injection rate of the pad is such as to hold an existing fracture or a created fracture open. Although it is not essential to the practice of this invention, a fracture may be created during the injection of the pad into the formation. After the pad of viscous gel has been injected in an amount sufficient to equalize a subsequent injection of acid and hold the fracture open, acid is then injected into the formation. By holding the fracture open, acid injected at a rate greater than 5 BPM is allowed to contact and circulate around clay damage in the formation and thereby remove it. With the gel pad placed ahead of the acid in the intervals, the reactivity of the acid with the clay is lengthened substantially thereby decreasing the volume of acid needed to remove clay damage from an interval or intervals being treated.

In addition to causing acid to enter all intervals equally because of the pad's restraining effect on the acid, acid placement is also optimized. By alternating stages of viscous, non-reactive pad and acid, acid reactivity is substantially increased as well as substantial optimization of acid placement in the desired intervals. Should hydraulic fracturing occur, zonal coverage of the acid is increased in addition to enhancing the overall effectiveness of acid in removing clay damage. Since acid entry into all intervals is equalized, more efficient radial coverage of the acid is obtained. If the surface pressure should decrease while injecting either the pad or acid into an interval, the injection rate is increased to re-establish a desired surface pressure. A desired surface pressure may be at or just below the pressure required to open a fracture.

Figure 2:
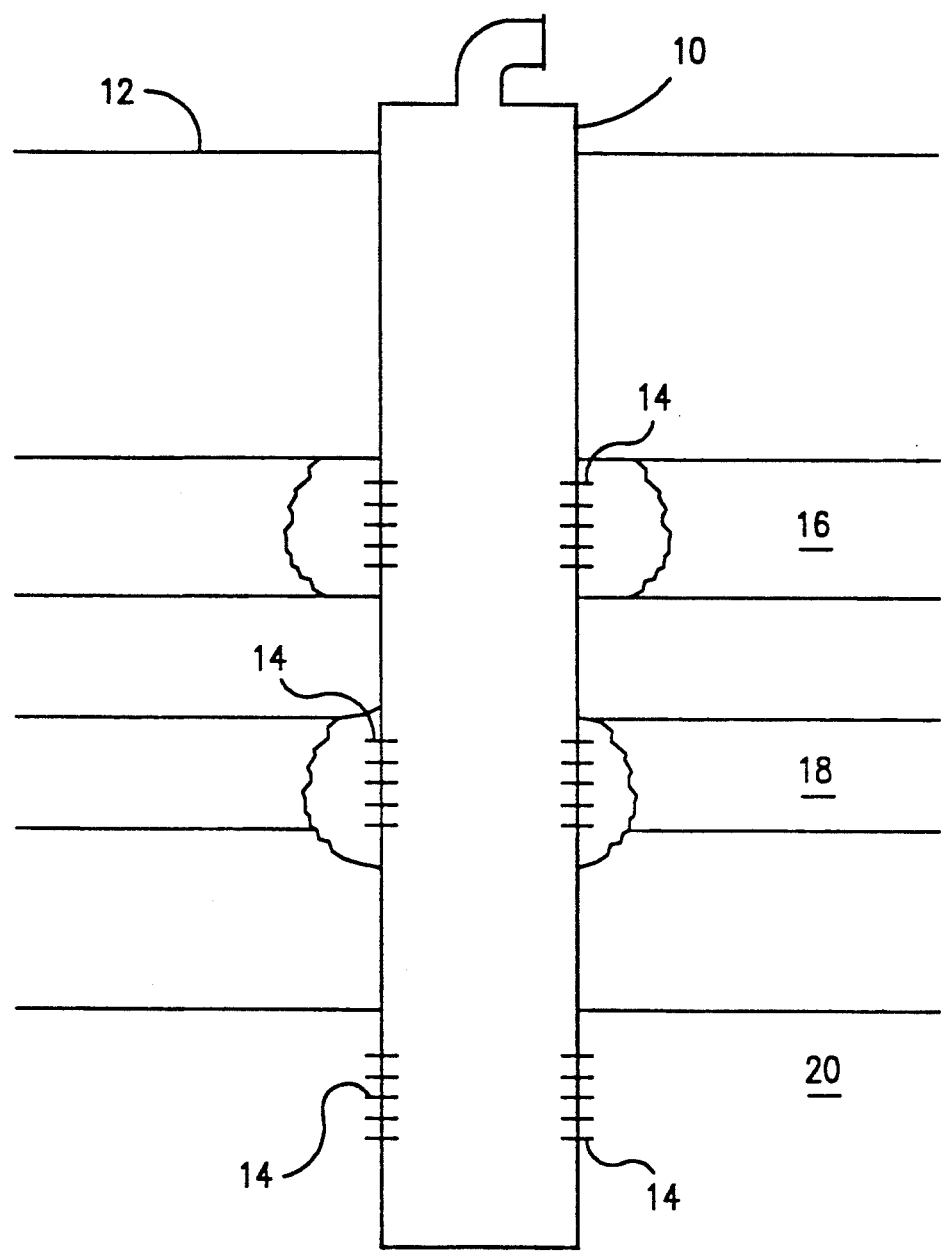
FIG. 2 is a schematic representation which depicts absence of the packer and all of the intervals or zones open to fluid flow.

As shown in FIG. 1, mechanical packer 22 is used to prevent the viscous gel pad from entering lower permeability zone 20. After the last pad of viscous gel has been placed into the intervals above the lower permeability zone, the packer can be removed and acid can be directed into the lower permeability zone while simultaneously acid treating the intervals thereabove. This occurence is shown in FIG. 2.

A non-reactive fluid or "pre-pad" which may be used herein includes salts of alkali or alkaline-earth metals in aqueous solutions and mixtures thereof. Zinc chloride solutions may also be used. A sodium chloride "pre-pad" is preferred. Although sodium chloride, potassium chloride, calcium chloride, and zinc chloride can be used, bromides of these salts can also be utilized. The specific gravity of the acid stage can range from about 1.05 to about 1.10 at room temperature. These salts are disclosed in U.S. Pat. No. 4,883,124 which issued to A. R. Jennings, Jr. on Nov. 28, 1989. This patent is hereby incorporated by reference herein.

Gelling agents useful herein are selected from the group consisting of water soluble hydratable polysaccharides having a molecular weight of at least about 100,000, preferably from about 200,000 to about 3,000,000 and derivatives thereof, water soluble synthetic polymers such as high molecular weight polyacrylamides, and water soluble hydratable polysaccharides which have been cross-linked with dialdehydes.

Examples of dialdehydes which can be utilized are glyoxal, malonic dialdehyde, succinic dialdehyde and glutaraldehyde.

Examples of suitable hydratable polysaccharides are guar gum, locust bean gum, karaya gum, carboxymethylcellulose, hydroxyethylcellulose and carboxymethylhydroxyethylcellulose. A particularly suitable hydratable polysaccharide is hydroxyethylcellulose having an ethylene oxide substitution within the range of about 1 to about 10 moles of ethylene oxide per anhydroglucose unit. A preferred such compound is hydroxyethylcellulose having an ethylene oxide substitution of 1.5 moles of ethylene oxide per anhydroglucose unit. Another preferred hydratable polysaccharide which is retarded at temperatures below about 100° F. is hydroxyethylcellulose having an ethylene oxide substitution of about 1.5 moles per anhydroglucose unit cross-linked with about 0.8 parts by weight glyoxal per 100 parts by weight hydroxyethylcellulose.

Examples of high molecular weight water soluble polyacrylamides are anionic copolymers of acrylamide and sodium acrylate, anionic random copolymers of polyacrylamide and a water soluble, polyethylenically unsaturated monomer, and cationic copolymers of acrylamide and a quaternary amine acrylate having molecular weights greater than about 500,000. Of these, a cationic mixture of copolymers of acrylamide and a quaternary amine acrylate having an average molecular weight of about 1,000,000 is preferred.

In preparing the compositions of the present invention, one or more of the above described gelling agents are added to water in an amount of the range of from about 0.1 to about 13 parts by weight gelling agents per 100 parts by weight of the water used. A temperature activated hexamethoxymethylmelamine cross-linking agent is preferably combined with the aqueous gelling agent solution in an amount in the range of from about 0.05 to about 5 parts by weight cross-linking agent per 100 parts by weight of water used. When the resulting composition reaches a temperature of about 120° F., the hexamethoxymethylmelamine reacts with the gelling agent to form a cross-linking highly viscous semisolid gel.

The cross-linking reaction takes place at a high rate when the aqueous composition is maintained at a pH in the range of from about 2 to about 6. A pH of about 4 to about is preferred. In order to insure that the desired pH is retained for a period of time sufficient to permit the composition to be introduced into the formation, a buffer can be incorporated into the composition. Examples of suitable buffers are potassium biphthalate, sodium biphthalate, sodium hydrogen fumarate, and sodium dihydrogen citrate. Of these, sodium biphthalate is preferred and is preferably combined with the composition in an amount in the range of from about 0.05 to about 2 parts by weight buffer per 100 parts by weight of water utilized.

A particularly suitable composition of the present invention for use as a treating fluid in high temperature formations is comprised of water; a cationic mixture of copolymers of acrylamide and a quaternary amine acrylate having an average molecular weight of about 1,000,000 present in an amount in the range of from about 0.05 to about 3 parts by weight per 100 parts by weight of water used; hydroxyethylcellulose having an ethylene oxide substitution of 1.5 moles per anhydroglucose unit present in an amount in the range of from about 0.05 to about 5 parts by weight per 100 parts by weight of water; hydroxyethylcellulose having an ethylene oxide substitution of about 1.5 moles per anhydroglucose unit cross-linked with about 0.8 parts by weight glyoxal per 100 parts by weight hydroxyethylcellulose present in an amount in the range of from about 0.05 to about 5 parts by weight per 100 parts by weight of water; hexamethoxymethylmelamine present in an amount in the range of from about 0.05 to about 0.5 parts by weight per 100 parts by weight of water. While this composition has some viscosity after being prepared at ambient temperatures ordinarily encountered at the surface, the glyoxal cross-linked hydroxyethylcellulose component is not appreciably hydrated until reaching a temperature of about 100° F. Further, as stated above, the cross-linking agent, hexamethoxymethylmelamine, does not begin to cross-link the hydrated gels until reaching a temperature of at least about 120° F.

As will be understood by those skilled in the art, a variety of internal breakers can be used with the compositions of the present invention for causing the highly viscous cross-linked gel formed to revert to a fluid having low viscosity. For example, a quantity of an internal breaker such as an oxidizing agent or an enzyme capable of hydrolyzing glucositic links can be added to the composition at the time it is prepared. Examples of suitable enzymes are alpha and beta amylases, amyloglucosidase, oligoglucosidase, invertase, multase, cellulase, and hemicellulase. Examples of suitable oxidizing agents are ammonium persulfate, potassium dichromate and potassium permanganate.

In utilizing the compositions of the present invention for treating high temperature subterranean formations, the composition is prepared at the surface by first mixing the gelling agent or agents, internal breaker and other components with the water. The cross-linking agent, hexamethoxymethylmelamine is preferably combined with the aqueous solution last, and the resulting gel forming composition is introduced into the formation to be treated. Upon reaching the formation, the composition is heated by the formation whereby the desired highly viscous cross-linked semisolid gel is formed.

The acid stage utilized may be any of the aqueous solutions of acid commonly employed for acidizing subterranean sandstone formations. For example, the solution of acid may be an aqueous solution of hydrochloric acid and hydroflouric acid. Commonly, an aqueous solution of hydrochloric acid and hydroflouric acid is employed for acidizing subterranean sandstone formations. Therefore, the preferred acid for utilization herein comprises a mixture of hydrochloric acid and hydroflouric acid. Although a hydrochloric acid and hydroflouric acid mixture is preferred, certain organic acids can be utilized in combination with hydroflouric acid in acidizing sandstone formations. These organic acids include formic, acetic and oxalic acids. When hydrochloric acid is utilized, it should be in a concentration of about 5 to about 28 volume percent. When combined with hydrochloric acid, the concentration of hydroflouric acid will range from about 0.5 to about 6 volume %. The use of a hydrochloric acid composition in matrix acidizing is disclosed in U.S. Pat. No. 4,787,456 which issued to Jennings, Jr. et al. on Nov. 29, 1988. This patent is hereby incorporated by reference herein.

The amount of acid solution employed in acidizing sandstone formations will vary according to the radial distance from the well to the interval that is to be acidized and will be up to about 10 feet, but in most cases will not exceed about 5 feet from the well or wellbore. The amount of acid solution in a stage will also vary according to the extent to which the clay damage in the formation is to be dissolved. Preferably, the amount of acid would be one hydrocarbon pore volume of the interval of the formation to be acidized. However, lesser amounts may be employed. Generally, the amount employed will be that ordinarily employed in conventional, commercial acidizing operations.

In addition to aqueous acid solutions, aromatic compounds such as xylene or toluene and mixtures thereof can be mixed with the acid to form low density dispersions for injecting into productive intervals requiring acid when practicing this invention. PARAGON acid dispersions can be used as low density dispersions for this purpose. These dispersions are marketed by Halliburton Services located in Duncan, Oklahoma. When utilized, the acid can be made a desired density and mixed with an aromatic compound such as xylene or toluene. Acids for use herein include hydrochloric, hydroflouric, formic, acetic, and oxalic acids.

Obviously, many other variations and modifications of this invention, as previously set forth, may be made without departing from the spirit and scope of this invention as those skilled in the art will readily understand. Such variations and modifications are considered part of this invention and within the purview and scope of the appended claims.

What is claimed is:

1. A method for improved matrix acidizing in a sandstone formation comprising:
   a) injecting a pad of viscous gel via a perforated wellbore into at least one high permeability interval or zone of the formation at a rate sufficient to cause a fracture therein to remain open so as to facilitate acid circulation around clay damage in the interval or zone while also cooling said zone; and
   b) injecting thereafter a liquid acid into the formation at a rate sufficient to the enter said interval equally as the pad restrains the flow of acid in said interval or zone thereby prolonging the acid's contact time and reactivity thereby removing clays which have damaged said interval and restoring the permeability thereof.

2. The method as recited in claim 1 where a pre-pad salt solution is injected into the interval before step a) which solution is selected from a member of the group consisting of sodium chloride, potassium chloride, zinc chloride, sodium bromide, potassium bromide, or zinc bromide.

3. The method as recited in claim 1 where the acid is a mixture of hydrochloric acid and hydroflouric acid.

4. The method as recited in claim 1 where the wellbore is vertical.

5. The method as recited in claim 1 where the acid utilized is an acid dispersion comprised of a mixture of xylene or toluene and a member selected from the group consisting of hydrochloric acid, oxalic acid, formic acid, acetic acid, or hydroflouric acid and mixtures thereof.

6. The method as recited in claim 1 where the acid utilized is an acid selected from a member of the group consisting of hydrochloric acid, oxalic acid, formic acid, acetic acid, or hydrofluoric acid and mixtures thereof.

7. The method as recited in claim 1 where in steps a) and b) the pad and acid are injected into said intervals at a rate of at least 5 BPM.

8. The method as recited in claim 1 where a mechanical packer is placed below the high permeability zone to prevent said gel from entering a low permeability zone located therebelow.

9. The method as recited in claim 1 where an oxidizing agent or an enzyme which comprises a gel breaker is placed in the viscous gel.

10. The method as recited in claim 1 where the viscous gel is a composition that comprises hydroxyethylcellulose treated with glyoxal or glyoxalated hydroxyethylcellulose.

11. A method for improved matrix acidizing in a sandstone formation comprising:
   a) injecting a pre-pad of a salt solution into desired intervals of the sandstone formation via a perforated wellbore that fluidly communicates with said interval;
   b) injecting a pad of viscous gel via the perforated wellbore into at least one high permeability interval or zone of the formation at a rate of at least about 5 BPM that is sufficient to cause a fracture therein to remain open so as to facilitate acid circulation around clay damage in the interval or zone while also cooling said zone; and
   c) injecting thereafter a liquid acid into the formation at a rate of about 5 BPM which is sufficient to the enter said interval equally as the pad restrains the flow of acid in said interval or zone thereby prolonging the acid's contact time and reactivity thereby removing clays which have damaged said interval and restoring the permeability thereof.

12. The method as recited in claim 11 where the pre-pad salt solution is selected from a member of the group consisting of sodium chloride, potassium chloride, zinc chloride, sodium bromide, potassium bromide, or zinc bromide.

13. The method as recited in claim 11 where the acid is a mixture of hydrochloric acid and hydroflouric acid.

14. The method as recited in claim 11 where the wellbore is vertical.

15. The method as recited in claim 11 where the acid utilized is an acid dispersion comprised of a mixture of xylene or toluene and a member selected from the group consisting of hydrochloric acid, oxalic acid, formic acid, acetic acid, or hydroflouric acid and mixtures thereof.

16. The method as recited in claim 11 where the acid utilized is an acid selected from a member of the group consisting of hydrochloric acid, oxalic acid, formic acid, acetic acid, or hydroflouric acid and mixtures thereof.

17. The method as recited in claim 11 where a mechanical packer is placed below the high permeability zone to prevent said gel from entering a low permeability zone located therebelow.

18. The method as recited in claim 11 where an oxidizing agent or an enzyme which comprises a gel breaker is placed in the viscous gel.

19. The method as recited in claim 11 where the viscous gel is a composition that comprises hydroxyethylcellulose treated with glyoxal or glyoxlated hydroxyethylcellulose.

20. The method as recited in claim 11 where crosslinking of the viscous gel in the interval occurs at a temperature of at least about 100° F.

21. The method as recited in claim 11 where steps b) and c) are repeated until clay damage has been removed from all desired intervals and the permeability thereof restored.

* * * * *